United States Patent [19]
Borth et al.

[11] Patent Number: 5,878,324
[45] Date of Patent: *Mar. 2, 1999

[54] METHOD AND SYSTEM FOR DISTRIBUTION OF WIRELESS DIGITAL MULTIMEDIA SIGNALS IN A CELLULAR PATTERN

[75] Inventors: David Edward Borth, Palatine; John Edward Major, Barrington Hills; William Victor Braun, Elmhurst; James Joseph Mikulski, Deerfield, all of Ill.

[73] Assignee: Motorola, Inc., Schaumburg, Ill.

[21] Appl. No.: 569,270

[22] Filed: Dec. 8, 1995

[*] Notice: This patent issued on a continued prosecution application filed under 37 CFR 1.53(d), and is subject to the twenty year patent term provisions of 35 U.S.C. 154(a)(2).

[51] Int. Cl.$^6$ ........................................ H04H 1/00
[52] U.S. Cl. ............................ 455/3.1; 455/454
[58] Field of Search .................... 348/723, 725, 348/726, 469, 12, 13; 455/3.1, 3.2, 446–450, 454; 379/59; 370/17

[56] References Cited

U.S. PATENT DOCUMENTS

| | | | |
|---|---|---|---|
| 5,233,643 | 8/1993 | Naeini et al. | 379/59 |
| 5,412,658 | 5/1995 | Arnold et al. | 455/454 |
| 5,467,342 | 11/1995 | Logston et al. | 370/17 |
| 5,535,215 | 7/1996 | Hieatt, III | 455/446 |
| 5,553,069 | 9/1996 | Ueno et al. | 455/454 |
| 5,594,937 | 1/1997 | Stiles et al. | 348/12 |

*Primary Examiner*—Victor R. Kostak
*Attorney, Agent, or Firm*—Darleen J. Stockley; K. Cyrus Khosravi

[57] ABSTRACT

A system (200) and method (300) provide an efficient communication system for distributing digital multimedia/HDTV signals to multimedia units in a cellular pattern. The method includes: 1) using at least a first primary wide area-antenna for, where selected, transmitting a digital multimedia/HDTV signal per frequency allocation over at least a portion of a predetermined reception area, wherein a plurality of patterns of cells tesselates the predetermined reception area; and 2) using cell-site antennas having transmitters, each located in a cell, for, where selected, transmitting, when the primary wide area-antenna is deselected, at least a first preselected digital multimedia/HDTV signal over an area of the cell, for providing the HDTV signal to a plurality of digital receivers in accordance with a predetermined scheme, wherein the digital multimedia/HDTV signal is associated with a predetermined frequency allocation.

18 Claims, 2 Drawing Sheets

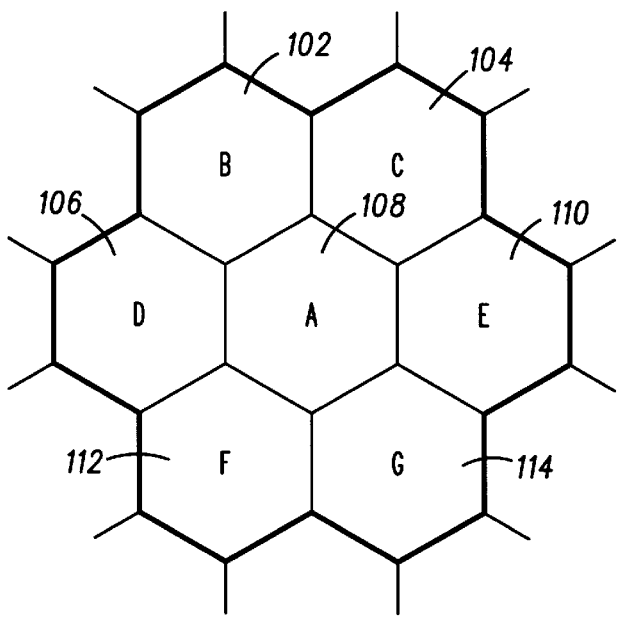

302
USING AT LEAST A FIRST PRIMARY WIDE-AREA ANTENNA HAVING A WIDE-AREA TRAMSMITTER IN A PREDETERMINED RECEPTION AREA, FOR, WHERE SELECTED, TRANSMITTING A DIGITAL MULTIMEDIA/HDTV/ATV SIGNAL PER FREQUENCY ALLOCATION OVER AT LEAST A PORTION OF A PREDETERMINED RECEPTION AREA, WHEREIN A PLURALITY OF PATTERNS OF CELLS TESSELATES THE PREDETERMINED RECEPTION AREA

304
USING A PLURALITY OF CELL-SITE ANTENNAS HAVING CELL-SITE TRANSMITTERS, EACH LOCATED IN A CELL, FOR WHERE SELECTED, TRANSMITTING AT LEAST A FIRST PRESELECTED DIGITAL MULTIMEDIA/HDTV/ATV SIGNAL ON A PRESELECTED CHANNEL OVER AN AREA OF EACH CELL WHEREIN ONE OF:
1) DIGITAL MULTIMEDIA/HDTV/ATV SIGNALS DIFFERENT FROM AT LEAST THE FIRST PRESELECTED DIGITAL MULTIMEDIA/HDTV/ATV SIGNAL ARE TRANSMITTED USING DIFFERENT FREQUENCIES THAN THE FREQUENCY FOR THE DIGITAL MULTIMEDIA/HDTV/ATV SIGNAL TRANSMITTED BY THE WIDE-AREA TRANSMITTER
2) AT LEAST THE FIRST PRESELECTED DIGITAL MULTIMEDIA/HDTV/ATV SIGNAL IS TRANSMITTED IN DIFFERENT CELLS IN THE FREQUENCY ALLOCATION OF A SINGLE MULTIMEDIA/HDTV/ATV SIGNAL
TO PROVIDE THE DIGITAL MULTIMEDIA/HDTV/ATV SIGNAL TO A PLURALITY OF DIGITAL RECEIVERS THAT ARE CONFIGURED FOR RECEIVING AT LEAST A PORTION OF THE FIRST DIGITAL MULTIMEDIA/HDTV/ATV SIGNAL FROM ONE OF: THE PRIMARY WIDE-AREA ANTENNA AND THE CELL-SITE ANTENNAS AND PROVIDING MULTIMEDIA/HDTV/ATV PROGRAM SELECTION FOR THE DIGITAL MULTIMEDIA/HDTV/ATV SIGNAL IN ACCORDANCE WITH A PREDETERMINED SCHEME, WHEREIN THE DIGITAL MULTIMEDIA/HDTV/ATV SIGNAL IS ASSOCIATED WITH A PREDETERMINED FREQUENCY ALLOCATION.

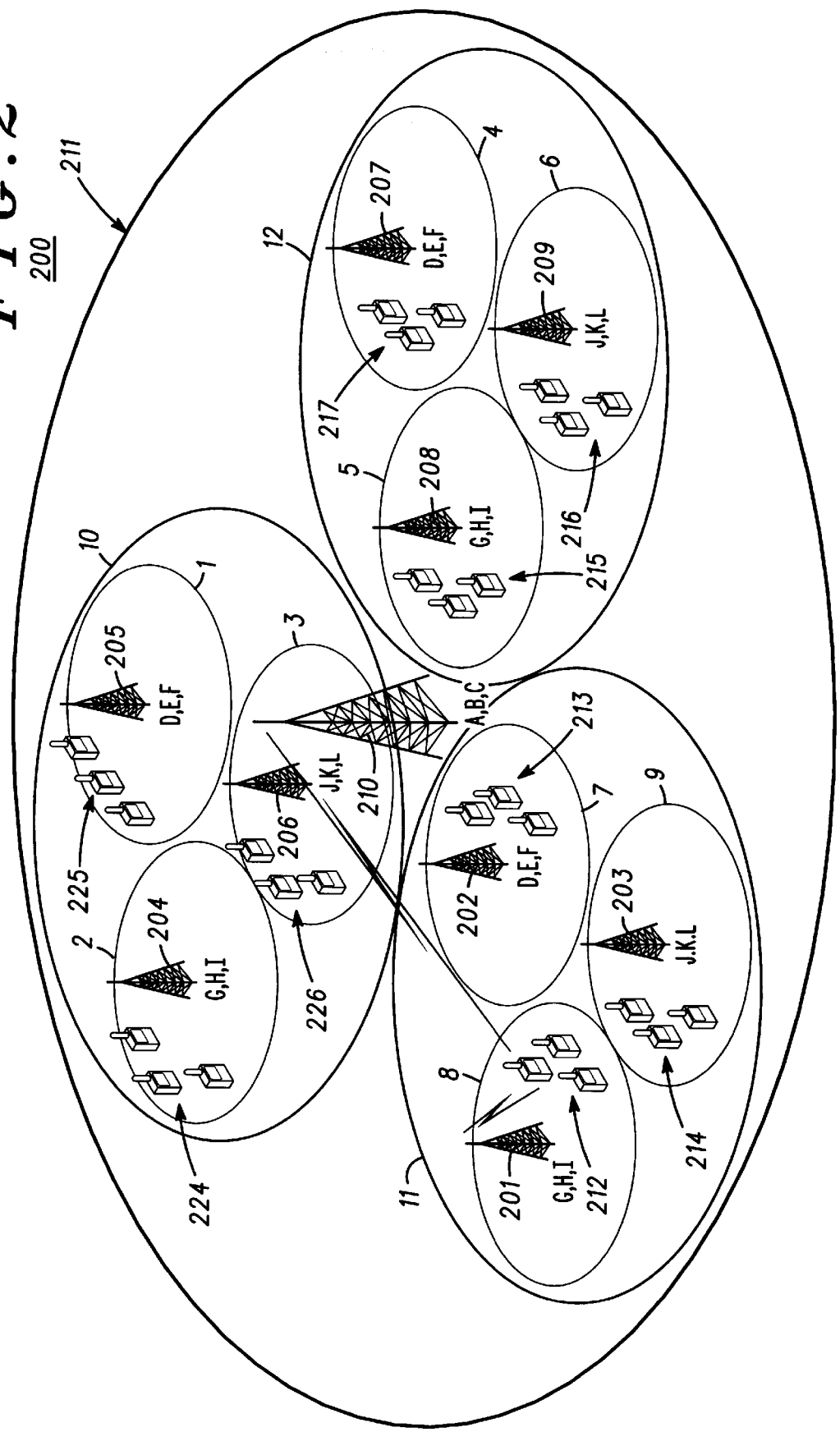

5,878,324

METHOD AND SYSTEM FOR DISTRIBUTION OF WIRELESS DIGITAL MULTIMEDIA SIGNALS IN A CELLULAR PATTERN

FIELD OF THE INVENTION

The present invention is related to communication systems, and more particularly, to distribution of wireless digital multimedia signals in a cellular pattern.

BACKGROUND OF THE INVENTION

Cellular digital communication systems include cellular telephone systems and mobile communication systems for transmission and reception of wireless digital signals. A service area of a cellular system is generally divided into a large number of cell sites. For example, as shown in FIG. 1, numeral 100, a cellular system may be divided into a plurality of adjacent hexagonal cell sites. In the system of FIG. 1, a channel plan is utilized to allow cell site A (108) to transmit on a frequency different from the frequency of the adjacent six cell sites (102, 104, 106, 110, 112, 114).

Typically, cellular systems have been utilized for efficient transmission of wireless telephone signals. Also, transmission of wireless telephone signals has been accomplished with the use of a wide-area antenna. A wide-area antenna is typically higher than a cell-site antenna and typically covers a larger area than a cell-site antenna. However, due to the large bandwidth requirement for digital multimedia signals, cellular systems have not been utilized to transmit digital multimedia signals. Thus, there is a need for a method and system for efficient distribution of digital multimedia signals in a cellular pattern.

BRIEF DESCRIPTIONS OF THE DRAWINGS

FIG. 1 is a diagrammatic representation of a division of a cellular system into a plurality of adjacent hexagonal cell sites as is known in the art.

FIG. 2 shows a schematic representation of one embodiment of a system in accordance with the present invention.

FIG. 3 is a flow chart of one embodiment of steps of a method in accordance with the present invention.

DETAILED DESCRIPTION OF A PREFERRED EMBODIMENT

Spectrum conservation is a major consideration in a digital cellular radio system. Cellular systems have a capacity for reusing frequencies within a metropolitan area to increase the number of users per frequency. For example, a TDMA digital cellular system will reuse one of a predetermined number of frequency sets (e.g., 4, 7, 12) at each cell site. Cell sites are typically contiguous cellular coverage areas. The maximum distance reached by a particular cell site transmitter is dependent on the height of the cell site transceiver's antenna relative to the terrain in which it is located and the power of the transmitter. Since digital multimedia signals such as high-definition television (HDTV) signals or wireless advanced television, ATV, digital signals require a relatively large bandwidth, distributing digital multimedia/HDTV signals in a cellular pattern has not been considered to be feasible.

The present invention implements efficient distribution of digital multimedia signals for programs selected by receivers (multimedia users) by a cellular central office or a plurality of cellular central offices. For example, in the Grand Alliance HDTV method 19.28 Megabits/s are broadcast in a 6 MHz frequency allocation. An HDTV/ATV-capable receiver will receive the 6 MHz signal. When a single HDTV format signal is broadcast, all 19.28 Megabits/sec are allocated for highresolution digital television. Alternatively, six channels may be transmitted of lower resolution digital television, each channel having approximately 3.2 Megabits/sec such that a selected combination provides an overall data rate of 19.28 Megabits/sec. The system may be adaptively configured to support a minimum number of supportable channels at a selected rate which are the channels requested by the majority of receivers, and then to configure itself to utilize progressively smaller bandwidths for additional channels, up to a maximum number of supportable channels.

FIG. 2, numeral 200, shows a schematic representation of one embodiment of a system in accordance with the present invention, which provides a bandwidth efficient communication system for distribution of wireless digital multimedia signals in a cellular pattern. In one implementation, each broadcaster or operator of an ATV system may be allocated 6 MHz of bandwidth, denoted by A,B,C,D, etc., in FIG. 2. The frequency allocations are distinct from each other. Furthermore, although a 3-cell frequency reuse pattern (the number of cells over which the total available allocation is divided) is shown in FIG. 2, other frequency reuse patterns are possible, including 1-cell reuse, 4-cell reuse, . . . .

The invention includes: A) at least a first primary wide area-antenna (210, . . . ) having a wide-area transmitter in a predetermined reception area (211), for, where selected, transmitting a digital multimedia signal per frequency (for example, frequencies A, B, C, . . . ) allocation over at least a portion of the predetermined reception area, wherein a plurality of patterns of cells tesselates the predetermined reception area; B) a plurality of cell-site antennas (201, 202, 203; . . . ) having cell-site transmitters, each located in a cell (8, 7, 9; . . . ), for, where selected, transmitting, at least a first preselected digital multimedia signal on a preselected channel (for example, channels D, E, F, G, H, I, J, K, L, . . . ) over an area of each cell, wherein one of: B1) digital multimedia signals different from at least the first preselected digital multimedia signal are transmitted using different frequencies than the frequency for the digital multimedia signal transmitted by the wide area transmitter, i.e., cellular transmission; and B2) at least the first preselected digital multimedia signal is transmitted in different cells in the frequency allocation of a single multimedia signal, i.e., wide-area transmission; and C) a plurality of digital receivers (212, . . . ; 213, . . . ; 214, . . . ; . . . ), configured for receiving at least a portion of the first digital multimedia signal from one of: the primary wide-area antenna and the cell-site antennas and providing multimedia program selection for the signal in accordance with a predetermined scheme, wherein the signal is associated with a predetermined frequency allocation.

Alternatively, the invention may be described to include: A) at least a first wide-area antenna (210, . . . ) having a wide-area transmitter for a predetermined coverage area (211), wherein the predetermined coverage area (211, . . . ) is tessellated by a predetermined set of coverage area cells that are smaller than the predetermined coverage area and are denoted by (8, 7, 9; . . . ), for transmitting a plurality of information sources on a predetermined set of distinct wide-area frequency allocations (A, B, C, . . . ); B) a plurality of cell site antennas (201, 202, 203, . . . ), each cell site antenna associated with corresponding cell and having a transmitter, for transmitting, on a predetermined set of frequencies G, H, I, . . . , distinct from the wide-area frequency allocations (A, B, C, . . . ), information sources, wherein the information sources may be identical to or distinct from the information sources broadcast by the wide-area transmitter(s) within the coverage area associated with a particular cell (8, . . . ); and C) a plurality of digital receivers (212, . . . ; 213, . . . ; 214, . . . ; . . . ), configured for receiving at least one of the information sources broadcast from one of: the at least first primary wide area-antenna and one of the cell-site antennas in correspondence with the digital receiver to provide multimedia program selection in accordance with a predetermined scheme, wherein each information source is associated with a predetermined frequency allocation.

For example, in the implementation shown in FIG. 2, the wide area antenna (210) may be employed by all operators having licenses for the coverage area (211), although this restriction is not required in other implementations. At the wide area antenna, the operators broadcast (or transmit) information sources on a set of distinct 6 MHz frequency allocations (A, B, C, . . . ), and this broadcast may be received by any ATV-capable receiver (i.e., digital receiver) within the coverage area (211). Additionally, the coverage area (211) is tessellated by a set of smaller coverage area cells (8, 7, 9; . . . ).

In FIG. 2, each cell (8, 7, 9; . . . ) contains a cell-site antenna (201, 202, 203; . . . ) which transmits on preselected frequencies (G, H, I, . . . ) to receivers located within the coverage area defined by the boundaries of cell (8, 7, 9; . . . ). In an ATV application for example, an ATV receiver located within cell 8 may receive, via tuning to a predetermined frequency assignment, any one of the set of frequency allocations G, H, I being transmitted within the cell 8 or the set of frequency allocations A, B, C being transmitted by the wide-area antenna (210).

The frequencies (G, H, I; . . . ) associated with each of the cells (8, 7, 9; . . . ) are reused again elsewhere within cells located in the associated wide-area coverage area (211), the distance between reuse being determined by the cell frequency reuse pattern being employed for the transmitted signal which is determined by the preselected modulation, coding, diversity, etc., employed in the communication system. For example, in FIG. 2, the frequency set (G, H, I) employed within the cell 8 may be reused in cell 2 and cell 5 in FIG. 2. Similarly, the frequency set (D, E, F) employed in cell 7 may be reused in cell 1 and cell 4, and the frequency set (J, K, L) employed in cell 9 may be reused in cell 3 and cell 6.

If it is desired to provide ubiquitous reception of a single information source within each cellular frequency reuse pattern consisting of cells 201, 202, and 203 in FIG. 2, then one channel in each of the cells must transmit the same information source. For example, channels D, G, and J (or any other allowable combination of frequencies) may broadcast the selected information source.

Alternatively, the selected information source may be simulcast (simultaneously transmitted on the same frequency) on the same frequency within the cell reuse pattern. In this case, for example, frequency G could be reused in cells 7, 8, and 9. To implement this scheme in a digital system, the transmitters at antennas 201, 202 and 203 must be time synchronized with each other and equalization may be required in the receiver. With this approach, more of the spectrum becomes available for broadcasting other information sources as frequencies D and J are now available from the above example.

If high-resolution HDTV is to be transmitted within the coverage area illustrated in FIG. 2, then each frequency allocation A, B, . . . may be used to transmit only one HDTV program. In this implementation, 6 HDTV programs may be broadcast using frequencies A, B, C of the wide-area antenna and frequencies D, E, F; G, H, I; and J, K, L, where each HDTV program is repeated in each cell reuse pattern, or, alternatively, 12 HDTV programs may be broadcast using frequencies A, B, C of the wide-area antenna and frequencies D,E,F; G, H, I; J, K, L, where now each reuse pattern transmits a different program. Where the simulcast scheme is utilized, more than 12 HDTV programs may be broadcast.

Alternatively, HDTV broadcasts may occur only on a subset of the available frequencies used for the wide-area antenna and the cell-site antennas. In this case, other available frequencies may be used to support lower resolution standard-definition TV (SDTV) (using the Grand Alliance terminology), with multiple SDTV broadcasts per channel. In this case, video-on-demand services may be offered within the cell sites with specific requests assigned to one of the available SDTV "channels" available within the cell site. For highly requested information (e.g., major sports events, etc.) a higher resolution broadcast may be made available by combining multiple SDTV channels.

In addition to multiple SDTV broadcasts using a single 6 MHz channel, other new services (information sources) may be offered in the available subdivided channels, e.g., broadcast traffic status (with maps), World Wide Web, etc.

Finally, where a predetermined minimum number of users are requesting distinct video-on-demand services, then the frequencies allocated to the wide-area antenna may be reallocated to the cell sites, thereby increasing the total number of distinct video-on-demand services that may be offered at the expense of losing wide-area coverage of a single TV channel.

The bandwidth efficient communication system of the present invention may be utilized for distribution of wireless advanced television, ATV, digital signals in a cellular pattern or HDTV signals. In one embodiment, at least the first digital multimedia signal may be a time-division multiplexed formatted signal comprised of multiple information sources, wherein the receiver selects one of the multiple information sources.

The portion of the first digital multimedia signal may include an entire first digital multimedia signal or multiple information sources.

The wide-area transmitter (210) and the plurality of cell site transmitters (202, 204, 206, 208, . . . ) may be configured to be responsive to the multimedia program selection requests by the receivers by providing selected multimedia programs in accordance with a predetermined bandwidth scheme. For example, the predetermined bandwidth scheme may include: A) prioritizing the multimedia program selection requests in accordance with a number of multimedia program requests per multimedia program; B) transmitting a first predetermined number of multimedia programs receiving a highest number of requests using a preselected bandwidth; and C) transmitting a second predetermined number of multimedia programs receiving fewer requests using at least one other bandwidth that is less than the preselected bandwidth.

FIG. 3, numeral 300, is a flow chart of one embodiment of steps of a method in accordance with the present invention. The method provides for broadcasting a digital signal to distribute wireless multimedia/high-definition television, HDTV/ATV, signals in a cellular pattern, comprising: A) using at least a first primary wide-area antenna having a transmitter located in the reception area, for, where selected, transmitting (302) a digital multimedia/HDTV/ATV signal per frequency allocation over at least a portion of a predetermined reception area, wherein a plurality of patterns of cells tesselates the predetermined reception area; and B) using cell-site antennas having transmitters, each located in a cell, for, where selected, transmitting (304), at least a first preselected digital multimedia/HDTV/ATV signal over an area of the cell, wherein one of B1–B2: B1) signals different from the at least first preselected digital multimedia/HDTV/ATV signal are transmitted in different cells in the frequency allocation of a single digital multimedia/HDTV signal; and B2) at least the first preselected digital multimedia/HDTV signal is transmitted in different cells in the frequency allocation of a single digital multimedia/HDTV /ATV signal; for providing the digital multimedia/HDTV/ATV signal to a plurality of digital receivers that are configured for receiving at least a portion of the first digital multimedia/HDTV/ATV signal from one of: the primary wide area-antenna and the cell-site antennas and providing multimedia program selection for the digital multimedia/HDTV/ATV signal in accordance with a predetermined scheme, wherein the digital multimedia/HDTV/ATV signal is associated with a predetermined frequency allocation.

As in the system, in the method at least the first digital multimedia signal may be selected to be a time division multiple access formatted signal comprised of multiple information sources wherein the receiver may select one of the multiple information sources. For example, a marker may be placed in the digital multimedia signal or packet transmitted by the cellular central office and the receiver may lock onto the signal and count to a predetermined position/time to provide a substantially infinite gradation of the signal/packet, and thus a substantially infinite number of channels. Clearly, the gradation is preselected based on provision of at least a minimum quality of signal to the receiver.

As in the system, in the method the portion of the first digital multimedia signal includes the entire first digital multimedia signal or multiple information sources.

The wide-area transmitter and cell-site transmitters may be configured to be responsive to the multimedia program selection requests by the receivers such that multimedia programs selected by receivers are provided in accordance with a predetermined bandwidth scheme. In one embodiment, the predetermined bandwidth scheme includes: A) prioritizing the multimedia program selection requests in accordance with a number of multimedia program requests per multimedia program; B) transmitting a first predetermined number of multimedia programs receiving a highest number of requests using a preselected bandwidth; and C) transmitting a second predetermined number of multimedia programs receiving fewer requests using at least one other bandwidth that is less than the preselected bandwidth.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A bandwidth-efficient, non- Asynchronous Transfer Mode (non-ATM) framework communication system for distribution of wireless advanced television, ATV, digital signals in a cellular pattern, comprising:

A) at least a first primary wide-area antenna having a transmitter located in the reception area, for, where selected, transmitting a digital ATV signal per frequency allocation over at least a portion of a predetermined reception area, wherein a plurality of patterns of cells tesselates the predetermined reception area;

B) cell-site antennas having transmitters, each located in a nonATM framework cell, for, where selected, transmitting, when the primary wide-area antenna is deselected, at least a first preselected digital ATV signal over an area of the cell, wherein one of B1–B2:

B1) signals different from at least the first preselected digital ATV signal are transmitted in different cells in the frequency allocation of a single ATV signal; and B2) at least the first preselected digital ATV signal is transmitted in different cells in the frequency allocation of a single ATV signal;

C) a plurality of ATV/HDTV signal digital receivers, configured for receiving at least a portion of the first digital ATV signal from one of: the primary wide-area antenna and the cell-site antennas and providing multimedia program selection for the ATV signal in accordance with a predetermined scheme, wherein the ATV signal is associated with a predetermined frequency allocation.

2. The system of claim 1 wherein the at least first digital multimedia signal is a TDMA formatted signal comprised of multiple information sources.

3. The system of claim 2 wherein the receiver selects one of the multiple information sources.

4. The system of claim 1 wherein the portion of the first digital multimedia signal includes one of:

A) the entire first digital multimedia signal; and

B) multiple information sources.

5. The system of claim 1 wherein the wide-area transmitter and cell site transmitters are configured to be responsive to the multimedia program selection requests by the receivers by providing selected multimedia programs in accordance with a predetermined bandwidth scheme.

6. The system of claim 5 wherein the predetermined bandwidth scheme includes:

A) prioritizing the multimedia program selection requests in accordance with a number of multimedia program requests per multimedia program;

B) transmitting a first predetermined number of multimedia programs receiving a highest number of requests using a preselected bandwidth; and C) transmitting a second predetermined number of multimedia programs receiving fewer requests using at least one other bandwidth that is less than the preselected bandwidth.

7. A bandwidth-efficient, non-Asynchronous Transfer Mode (non-ATM) framework communication system for distribution of wireless high-definition television, HDTV, signals in a cellular pattern, comprising:

A) at least a first primary wide-area antenna having a transmitter located in the reception area, for, where selected, transmitting a HDTV signal per frequency allocation over at least a portion of a predetermined reception area, wherein a plurality of patterns of cells tesselates the predetermined reception area;

B) cell-site antennas having transmitters, each located in a nonATM framework cell, for, where selected, transmitting, when the primary wide-area antenna is deselected, at least a first preselected HDTV signal over an area of the cell, wherein one of B1–B2:

B1) signals different from the at least first preselected HDTV signal are transmitted in different cells in the frequency allocation of a single HDTV signal; and B2) at least the first preselected digital multimedia signal is transmitted in different cells in the frequency allocation of a single HDTV signal;

C) a plurality of digital ATV/HDTV signal receivers, configured for receiving at least a portion of the first HDTV signal from one of: the primary wide-area antenna and the cell-site antennas and providing multimedia program selection for the HDTV signal in accordance with a predetermined scheme, wherein the HDTV signal is associated with a predetermined frequency allocation.

8. The system of claim 7 wherein the at least first digital multimedia signal is a time-division multiplexed formatted signal comprised of multiple information sources.

9. The system of claim 8 wherein the receiver selects one of the multiple information sources.

10. The system of claim 7 wherein the portion of the first digital multimedia signal includes one of:

A) the entire first digital multimedia signal; and

B) multiple information sources.

11. The system of claim 7 wherein the wide-area transmitter and cell-site transmitters are configured to be responsive to the multimedia program selection requests by the receivers by providing selected multimedia programs in accordance with a predetermined bandwidth scheme.

12. The system of claim 11 wherein the predetermined bandwidth scheme includes:

A) prioritizing the multimedia program selection requests in accordance with a number of multimedia program requests per multimedia program;

B) transmitting a first predetermined number of multimedia programs receiving a highest number of requests using a preselected bandwidth; and C) transmitting a second predetermined number of multimedia programs receiving fewer requests using at least one other bandwidth that is less than the preselected bandwidth.

13. A method for broadcasting a digital signal to distribute wireless multimedia/high-definition television in a non-Asynchronous Transfer Mode (non-ATM) framework communication system, HDTV/ATV signals in a cellular pattern, comprising:

A) using at least a first primary wide-area antenna having a transmitter located in the reception area, for, where selected, transmitting a digital multimedia/HDTV/ATV signal per frequency allocation over at least a portion of a predetermined reception area, wherein a plurality of patterns of cells tesselates the predetermined reception area; and B) using cell-site antennas having transmitters, each located in a non-ATM framework cell, for, where selected, transmitting, when the primary wide-area antenna is deselected, at least a first preselected digital multimedia/HDTV/ATV signal over an area of the cell, wherein one of B1–B2:

B1) signals different from the at least first preselected digital multimedia/HDTV/ATV signal are transmitted in different cells in the frequency allocation of a single digital multimedia/HDTV/ATV signal; and B2) at least the first preselected digital multimedia/HDTV/ATV signal is transmitted in different cells in the frequency allocation of a single digital multimedia/HDTV/ATV signal;

for providing the digital multimedia/HDTV/ATV signal to a plurality of digital ATV/HDTV signal receivers that are configured for receiving at least a portion of the first digital multimedia/HDTV/ATV signal from one of: the primary wide- area antenna and the cell-site antennas and providing multimedia program selection for the digital multimedia/HDTV/ATV signal in accordance with a predetermined scheme, wherein the digital multimedia/HDTV/ATV signal is associated with a predetermined frequency allocation.

14. The method of claim 13 wherein the at least first digital multimedia signal is a time-division multiplexed formatted signal comprised of multiple information sources.

15. The method of claim 14 including selection, by the receiver, one of the multiple information sources.

16. The method of claim 13 wherein the portion of the first digital multimedia signal includes one of:

A) the entire first digital multimedia signal; and

B) multiple information sources.

17. The method of claim 13 including configuring the wide-area transmitter and cell-site transmitters to be responsive to the multimedia program selection requests by the receivers by providing selected multimedia programs in accordance with a predetermined bandwidth scheme.

18. The method of claim 17 wherein the predetermined bandwidth scheme includes:

A) prioritizing the multimedia program selection requests in accordance with a number of multimedia program requests per multimedia program;

B) transmitting a first predetermined number of multimedia programs receiving a highest number of requests using a preselected bandwidth; and C) transmitting a second predetermined number of multimedia programs receiving fewer requests using at least one other bandwidth that is less than the preselected bandwidth.

* * * * *